(12) United States Patent
Houck et al.

(10) Patent No.: US 6,267,882 B1
(45) Date of Patent: Jul. 31, 2001

(54) SYSTEM FOR FILTRATION OF SEPTIC TANK SEWAGE EFFLUENT

(75) Inventors: Michael H. Houck; Thomas K. Weaver, both of Brevard, NC (US)

(73) Assignee: Shooting Star L.L.C., Brevard, NC (US)

(*) Notice: Subject to any disclaimer, the term of this patent is extended or adjusted under 35 U.S.C. 154(b) by 0 days.

(21) Appl. No.: 09/378,851

(22) Filed: Aug. 23, 1999

Related U.S. Application Data
(60) Provisional application No. 60/097,675, filed on Aug. 24, 1998.

(51) Int. Cl.[7] .................................................. B01D 24/10
(52) U.S. Cl. ......................... 210/170; 210/258; 210/284; 210/290; 210/532.2; 210/484; 405/43; 405/45
(58) Field of Search ..................................... 210/747, 150, 210/151, 170, 258, 290, 435, 532.2, 284, 265, 484, 335; 405/36, 43, 45, 52

(56) References Cited

U.S. PATENT DOCUMENTS

| | | | | |
|---|---|---|---|---|
| 1,942,584 | * | 1/1934 | Weinstein | 210/132 |
| 3,029,950 | * | 4/1962 | Frasca | 210/256 |
| 3,642,138 | * | 2/1972 | Sheda | 210/170 |
| 4,274,966 | * | 6/1981 | Palmer | 210/618 |
| 4,465,594 | * | 8/1984 | Laak | 210/151 |
| 4,534,865 | * | 8/1985 | Sundberg | 210/692 |
| 5,015,123 | * | 5/1991 | Houck et al. | 405/45 |
| 5,308,479 | * | 5/1994 | Iwai et al. | 210/151 |
| 5,352,357 | * | 10/1994 | Perry | 210/150 |
| 5,645,732 | * | 7/1997 | Daniels | 210/747 |
| 5,738,781 | * | 4/1998 | Carlson | 210/170 |
| 5,788,409 | * | 8/1998 | Johnson | 405/43 |
| 5,897,777 | * | 4/1999 | Zoeller et al. | 210/602 |
| 5,951,876 | * | 9/1999 | Snowball | 210/748 |
| 5,997,735 | * | 12/1999 | Gorton | 210/151 |
| 6,136,190 | * | 10/2000 | Zoeller et al. | 210/299 |

* cited by examiner

Primary Examiner—Peter A. Hruskoci
(74) Attorney, Agent, or Firm—Allen, Dyer, Doppelt, Milbrath & Gilchrist, P.A.

(57) ABSTRACT

The invention describes a filter container, system and method for filtering sewage effluent from a septic tank. The filter container includes a body having a lower end and an upper end, having walls forming a floor positioned at the lower end and sides connected to the floor and positioned to define an inner cavity extending from the lower end to the upper end. The body of the container has a mouth opening positioned at the upper end to provide access to the inner cavity. A lid is positioned on the upper end of the body so as to cover the mouth cavity to thereby close the container. A plurality of pipes connect the container in fluid communication with the septic tank or with another container, the plurality of pipes including at least one inlet pipe for delivering sewage effluent to the inner cavity and at least one outlet pipe for discharging filtered sewage effluent from the inner cavity. The filter container also includes at least one filter having a filter matrix of a lightweight particulate material, the filter being positioned within the inner cavity of the filter container for filtering the sewage effluent. A system for filtering sewage effluent from a septic tank, the system includes a plurality of filter containers connected in fluid communication with the septic tank such that each filter container of the plurality is connected with at least one other filter container to form a chain of filter containers.

25 Claims, 7 Drawing Sheets

SYSTEM FOR FILTRATION OF SEPTIC TANK SEWAGE EFFLUENT

RELATED APPLICATIONS

This nonprovisional application claims the priority date of copending provisional patent application Serial No. 60/097,675, filed on Aug. 24, 1998, which is incorporated herein by reference in its entirety, the benefit of its earlier filing date being hereby claimed according to 37 C.F.R. §1.78(4).

FIELD OF THE INVENTION

The present invention relates to drainage fields for septic tank sewage effluent and, more particularly, to a filter container and system for filtering septic tank sewage effluent prior to land application.

BACKGROUND OF THE INVENTION

Conventional drainage fields for land application of septic tank sewage effluent are constructed by digging trenches on land adjoining the septic tank. Filtering beds are created in these trenches by depositing a layer of filtering material in the bottom of the trenches. Conventional filtering material is rock, crushed stone gravel, sand, or a combination thereof. A network of perforated pipe is connected to the septic tank and laid in the trenches on top of the filter bed. Such systems normally operate by gravity flow, however, it is common practice to connect a pump to the septic tank to aid in moving the sewage effluent from the septic tank and through the drainage field, particularly where required by the lay of the land. The sewage effluent is distributed through the network of perforated pipes and trickles onto and through the filter bed, where its nutrient content is reduced by microbial action. After passing through the filtering material, the sewage effluent is absorbed by the soil surrounding and underlying the trench.

Standard practices, however, suffer from severe disadvantages. For example, conventional drainage fields for septic tanks require the transportation of heavy materials, such as the stone, rock gravel or sand required for installing filtration beds. In addition, conventional drainage fields generally operate for years, however, they must be dug up and replaced when they become clogged or otherwise stop functioning as designed. Replacement of the drainage field costs essentially as much as installing a completely new field, and perhaps more.

SUMMARY OF THE INVENTION

With the foregoing in mind, the present invention advantageously provides a system for filtering sewage effluent from a septic tank, including a novel filter container and associated method. The system is intended to replace a conventional septic tank drainage field which employs heavyweight filtering materials such as rock gravel and which cannot be easily renewed once the drainage field becomes clogged or otherwise inefficient.

The filter container includes a body having an inner cavity extending from a lower end of the container to an upper end, and a mouth opening positioned at the upper end of the body to provide access to the inner cavity. A lid is positioned on the upper end of the body so as to cover the mouth cavity and thereby close the container. A plurality of pipes connects the container in fluid communication with the septic tank or with another container. The pipes include at least one sewage delivery pipe for delivering sewage effluent to the inner cavity of the container and at least one outlet pipe for discharging filtered sewage effluent from the container. The container also includes at least one filter having a filter matrix made of a lightweight particulate material. The filter is positioned within the inner cavity of the container for filtering the sewage effluent.

In a preferred embodiment the filter container may further include a plurality of sewage delivery pipes positioned at the upper end of the container to deliver sewage effluent into the inner cavity so that the sewage effluent flows therefrom through the filter matrix. These sewage delivery pipes may be preassembled drainage lines having a perforated pipe positioned within a water permeable sleeve member containing the filter matrix so that the sewage delivery pipes are essentially surrounded by the filter matrix to thereby provide added filtration for the sewage effluent. The filter container may also include a clean out port positioned at the lower end and connecting the inner cavity to the outside thereby providing access for cleaning out the inner cavity or flushing the filter matrix.

The filter container in another preferred embodiment includes an inlet T-pipe and an outlet T-pipe positioned substantially opposite each other at the lower end of the container body so that the leg of said inlet T-pipe forms an inlet to the inner cavity and the leg of said outlet T-pipe forms an outlet to the inner cavity, the second pipe of each said T-pipe being positioned substantially vertically within the inner cavity. In addition, the filter matrix may be disposed within a water permeable sleeve member, so that the filter is easily removable from the container, allowing for changing the filter as necessary. The lightweight particulate material included in the filter matrix is preferably a synthetic material selected from expanded polystyrene particles, and rubber chips from ground up tires. Final discharge of filtered effluent is accomplished from a plurality of discharge openings providing fluid communication from the inner cavity of a filter container to the outside to thereby discharge filtered effluent from the container to a soil drainage field.

The filter containers may be connected to form a system for filtering sewage effluent from a septic tank. The system includes a plurality of filter containers connected in fluid communication with the septic tank such that each container of the plurality is connected with at least one other filter container to form a chain of filter containers connected to the septic tank. The system is suitable for use as a complete drain field for a septic tank system. The invention also includes an associated method employing the filter container and the system for filtering sewage effluent from a septic tank.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

Figure 1:
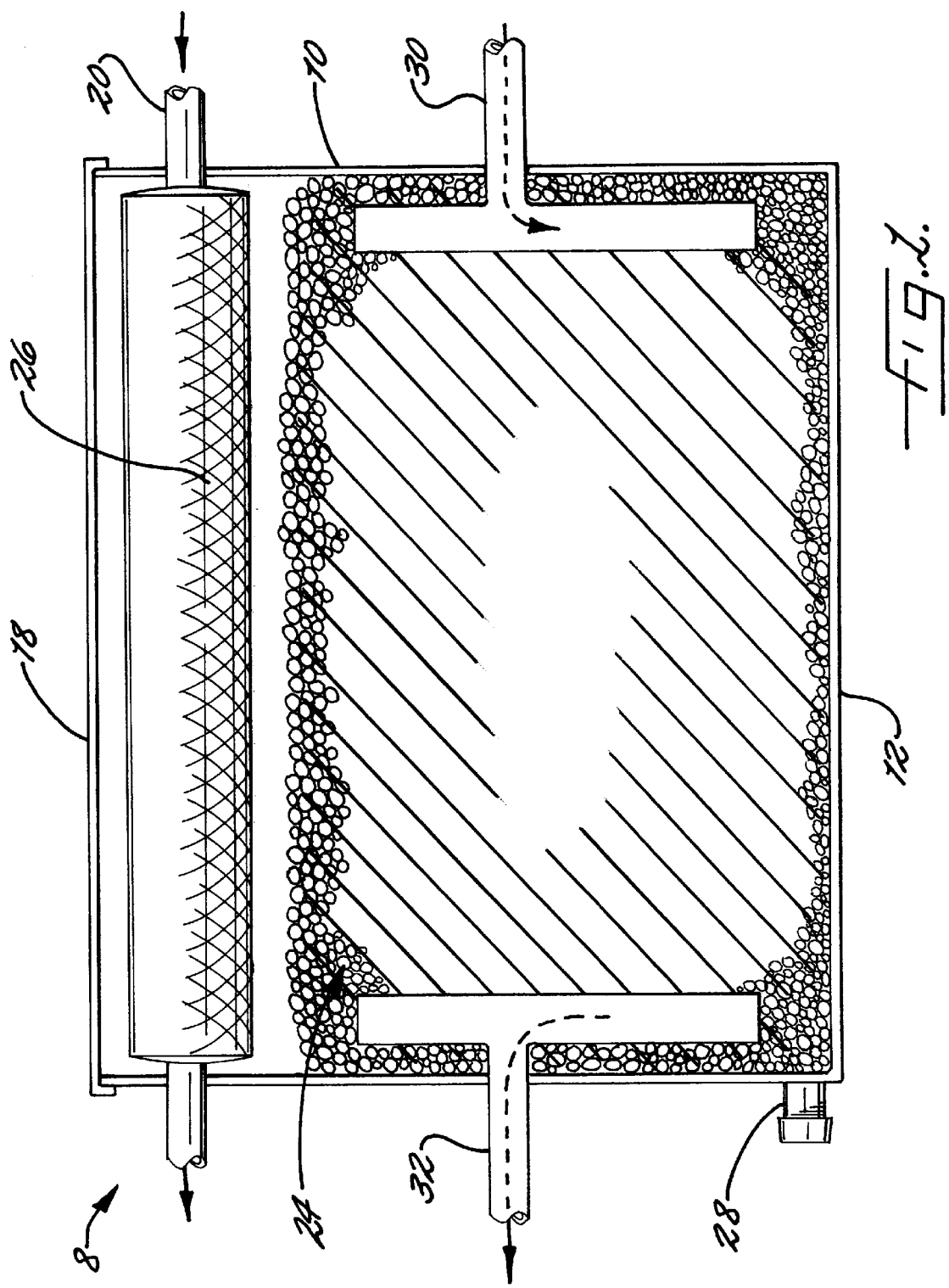
FIG. 1 is a cross sectional side elevation of a filter container according to an embodiment of the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation when used indicates similar elements in alternative embodiments.

FIGS. 1 through 7 illustrate a filter container for filtering sewage effluent from a septic tank, a system for filtering such effluent using a plurality of filter containers connected in a chain of containers, and an associated method for such filtering.

As shown in FIGS. 1 through 5, the invention includes a filter container 8 for filtering sewage effluent from a septic tank. The filter container 8 includes a body 10 having a lower end and an upper end, having walls forming a floor 12 positioned at the lower end and sides connected to the floor 12 and positioned to define an inner cavity 16 extending from the lower end to the upper end. The body 10 also has a mouth opening 16 positioned at the upper end to provide access to the inner cavity 14. The container 8 also has a lid 18 positioned on the upper end of the body 10 so as to cover the mouth opening 16 to thereby close the container 8. Because these containers are intended to be buried in trenches which are part of the drainage field for a septic tank, a lid 18 allows the container 8 to be covered with soil, preventing fouling of the associated pipes and filters within the container. The lid 18 may be secured to the container body 10 by removable fasteners, or may simply rest on top of the container, where the weight of overlying soil will hold it in place. A plurality of pipes may be used to connect the container 8 in fluid communication with the septic tank or with another container 8. The plurality of pipes includes at least one sewage delivery pipe 20 for delivering sewage effluent to the inner cavity 14 and at least one outlet pipe 32 for discharging filtered sewage effluent from the inner cavity 14 of the container 8. The container body 10 holds within its inner cavity 14 at least one filter 24 having a filter matrix made of a lightweight particulate material.

In a preferred embodiment, the plurality of sewage delivery pipes 20 is positioned at the upper end of the container 8, the pipes being perforated pipes to thereby deliver sewage effluent into the inner cavity 14 so that the sewage effluent flows out from the sewage delivery pipes 20 and down through the filter matrix in the inner cavity 14. The plurality of sewage delivery pipes 20 may be preassembled drainage lines having a perforated pipe positioned within a water permeable sleeve member 26 containing the filter matrix so that the sewage delivery pipes 20 are essentially surrounded by the filter matrix to thereby provide added filtration for the sewage effluent. Preferred preassembled drainage lines are those described in U.S. Pat. No. 5,015,123, which is incorporated herein by reference in its entirety.

The filter container 8 in another preferred embodiment may further include a clean out port 28 positioned at the lower end of the container body 10, connecting the inner cavity 14 to the outside to thereby provide access for cleaning the inner cavity 14 or flushing out the filter 24. The container body 10 also includes an inlet T-pipe 30 and an outlet T-pipe 32. As known in the art each T-pipe has a first pipe forming a crossbar at the top of the T-pipe and a second pipe connected in fluid communication with the first pipe and forming a leg of the T-pipe. The inlet T-pipe 30 and outlet T-pipe 32 are positioned substantially opposite each other at the lower end of the container body 10 so that the leg of the inlet T-pipe 30 forms an inlet to the inner cavity 14 and the leg of the outlet T-pipe 32 forms an outlet, the second pipe or crossbar of each said T-pipe being positioned within the inner cavity 14 in substantially a vertical orientation. The T-pipes may be used to connect one filter container with another filter container, essentially forming a chain of filter containers. The inlet T-pipe 30 of the first filter container in the chain downstream from the septic tank may not be connected to the septic tank, as the sewage effluent is delivered to the filter container by sewage delivery pipe or pipes 20 positioned at the upper end of the container, as shown in FIGS. 1, 3, 4 and 5. By connecting the outlet T-pipe 32 of one container to the inlet T-pipe 30 of the preceding container in the chain of containers, filtered sewage effluent is allowed to flow down the chain of filter containers, from one filter container to another to provide increased filtration, and thereafter to be discharged from the last outlet T-pipe 32 in the chain of containers to a soil drain field for final disposal. Such a chain of filter containers is illustrated in FIGS. 6 and 7.

Figure 5:
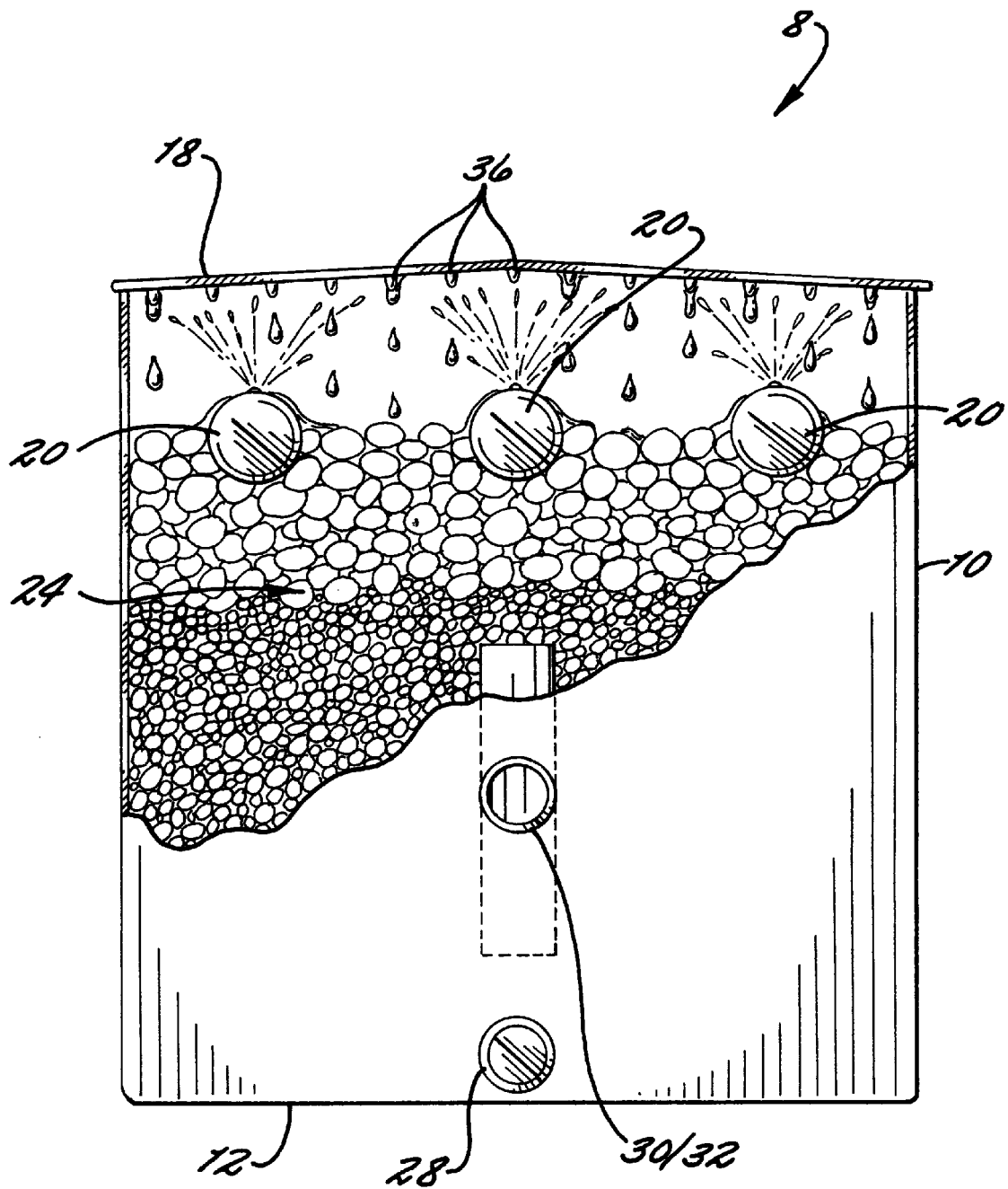
FIG. 5 is a cutaway end view of a filter container wherein sewage delivery pipes spray sewage effluent upwardly toward the lid of the container.

In yet another preferred embodiment, the filter container 8 has at least one sewage delivery pipe 20 positioned at the upper end of the container body 10, the pipe having perforations positioned to form a sewage effluent spray directed upwardly toward the lid 18 of the container 8 so as to drip therefrom onto the filter matrix. In any of the embodiments of the invention herein described, a pump 34 may be preferably connected to pump the sewage effluent from the septic tank to the filter container 8, thereby aiding in spraying the effluent from the sewage delivery pipe 20. As a further aid to filtration, the lid 18 has a lower surface forming a ceiling for the inner chamber, and the lower surface is inclined and has drip nipples 36 protruding therefrom. The inclination of the lower surface of the lid 18 is formed by the surface extending along two planes connected to each other so as to define a substantially obtuse angle forming a ridge positioned substantially aligned with a midline of the inner cavity 14 to thereby aid in dripping sewage effluent from the drip nipples 36, as best shown in FIG. 5. As the sewage effluent sprays from the sewage delivery pipe 20, it flows along the inclined lower lid 18 surface and collects on the drip nipples 36, which act essentially like stalactites from which the sewage effluent drips onto the filter matrix.

Figure 2:
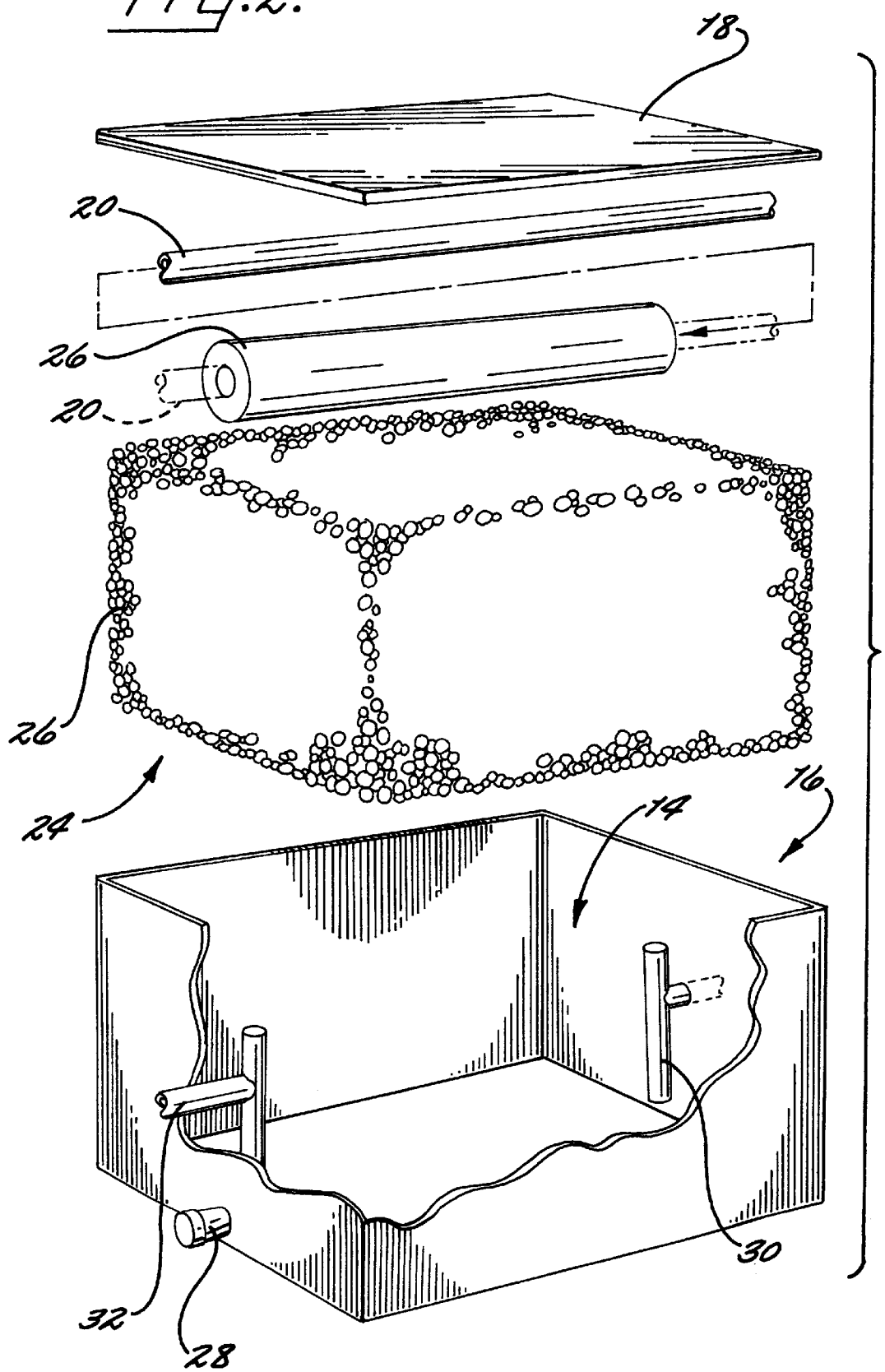
FIG. 2 shows an exploded view of a preferred filter container.
Figure 3:
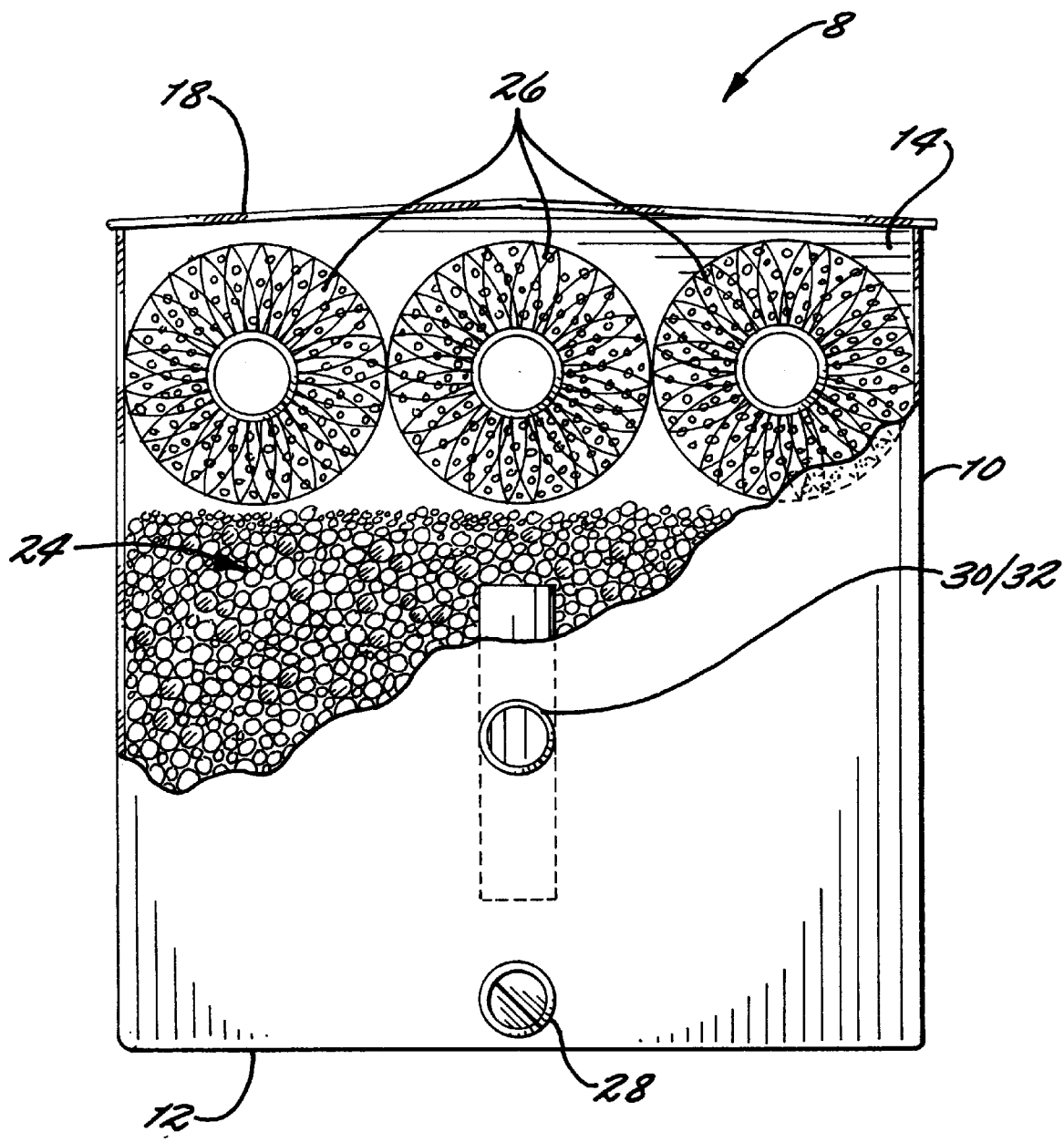
FIG. 3 is a cutaway end view of a preferred filter container.
Figure 4:
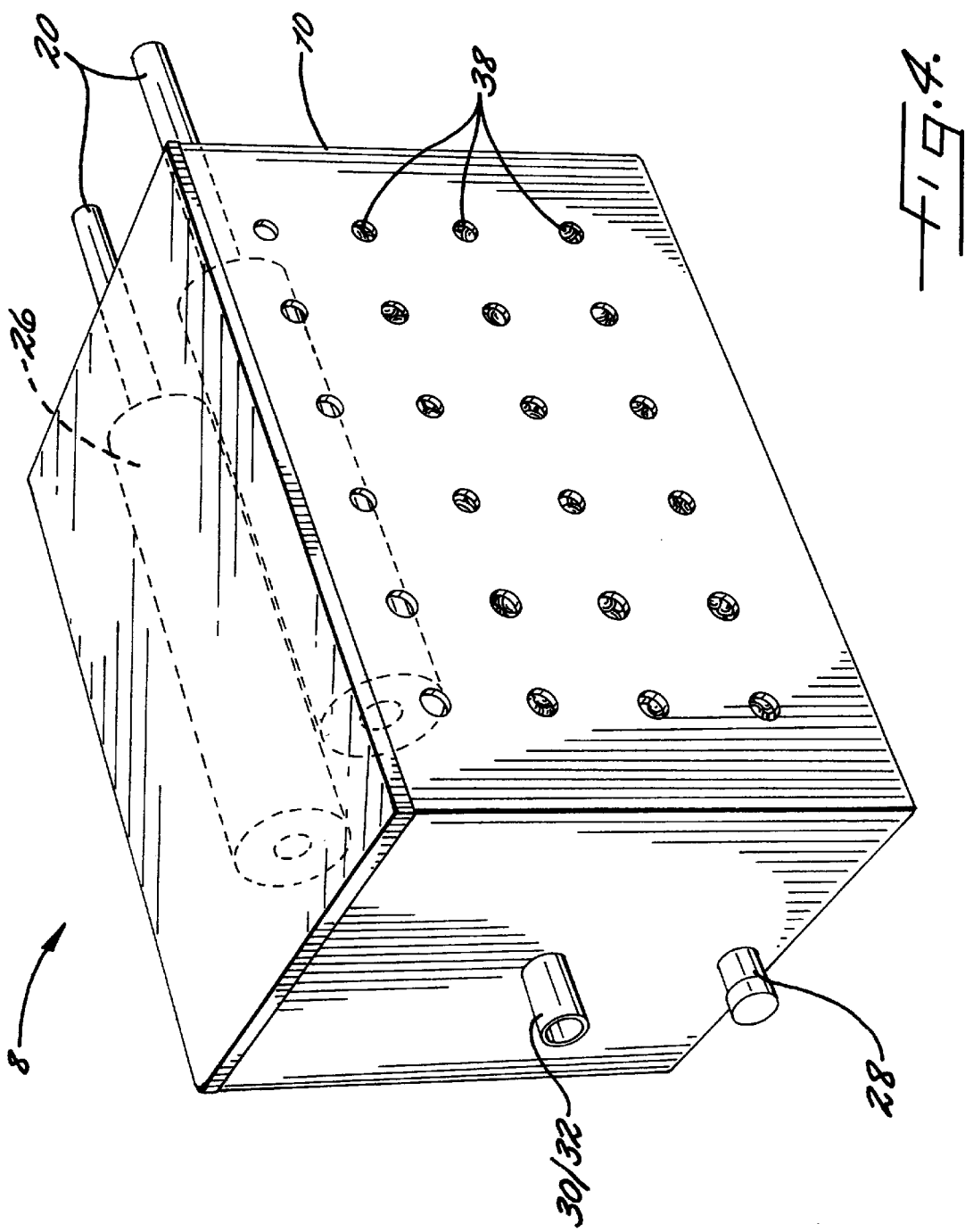
FIG. 4 is a perspective elevation showing a filter container including perforations for discharge of filtered sewage effluent.

As shown in FIGS. 1 and 5, the filter matrix may include relatively larger particulate material positioned toward the upper end of the inner cavity 14 and relatively smaller particulate material positioned toward the lower end of the inner cavity 14 to thereby provide a filter matrix having a pore size progressively smaller from the upper end to the lower end of the filter container body 10. The filter matrix may be contained within a water permeable sleeve member 26, so that the filter is easily removable from the container 8, thereby allowing for changing filters as often as necessary without digging up the entire septic tank drainage field. A plurality of such sleeve members 26 containing filter matrix may be positioned within one filter container 8, as best seen in FIGS. 2, and 3. Sleeve members 26 may be disposed with particulate material of various sizes, that is, a sleeve may be provided with larger-sized pieces, while other sleeves are prepared with smaller-sized pieces. The filter containers may then be disposed with multiple sleeve members 26, each sleeve having a different size of filtering particulate, thus providing any desired range of filter particle gradation through the filter matrix according to the needs of the job. The lightweight particulate filter material is preferably selected from expanded polystyrene, and rubber from ground up tires. Those skilled in the art will appreciate that the filtering particles may be configured in any desired shape, such as rounded beads, cubes, or random irregular shapes. The filter container 8 may also include a plurality of filtered effluent discharge openings 38 providing fluid communication from the inner cavity 14 to the outside to thereby discharge filtered effluent from the filter container 8 to a soil drainage field as the final step in treatment of the sewage effluent.

Figure 6:
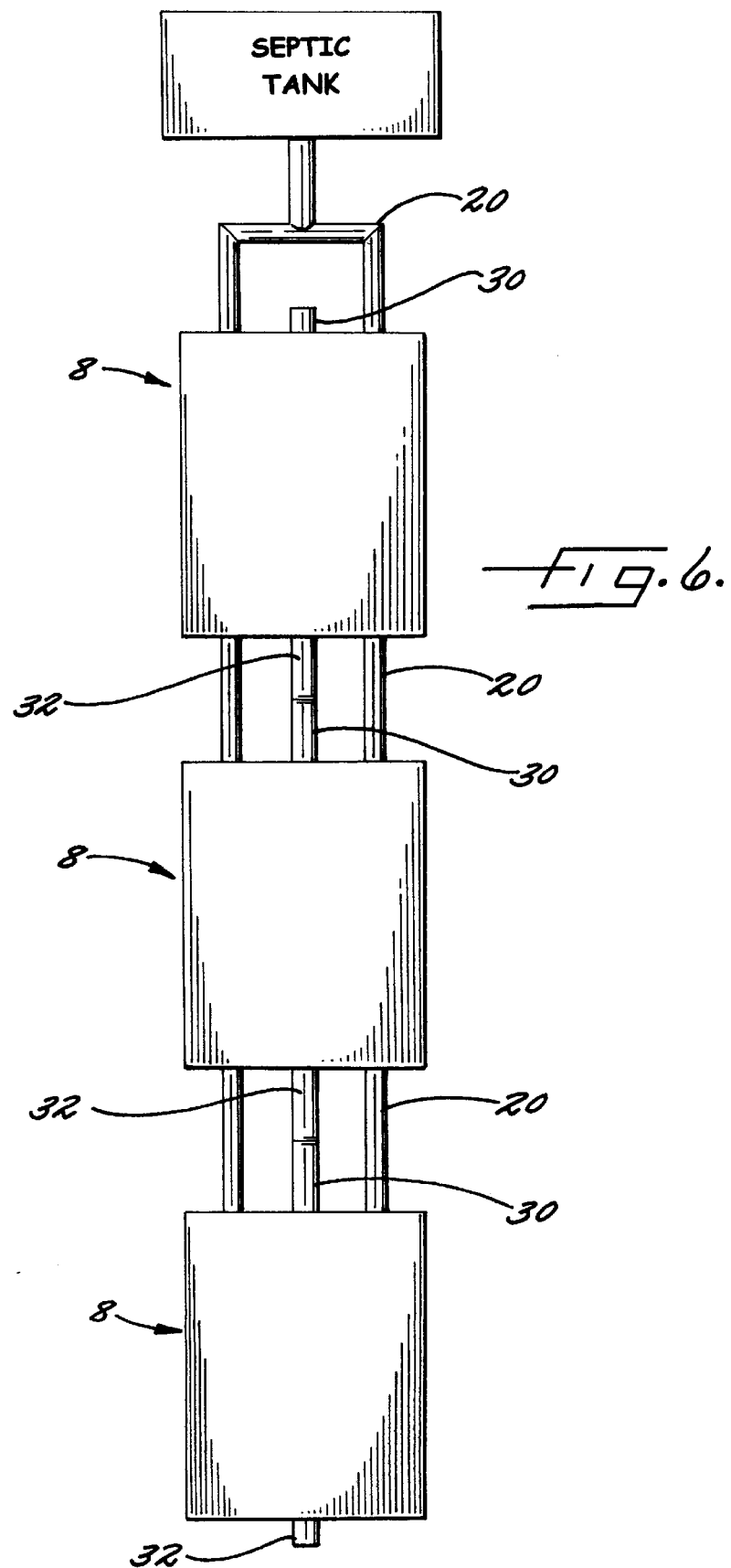
FIG. 6 is a schematic diagram showing a chain of filter containers connected to a septic tank.
Figure 7:
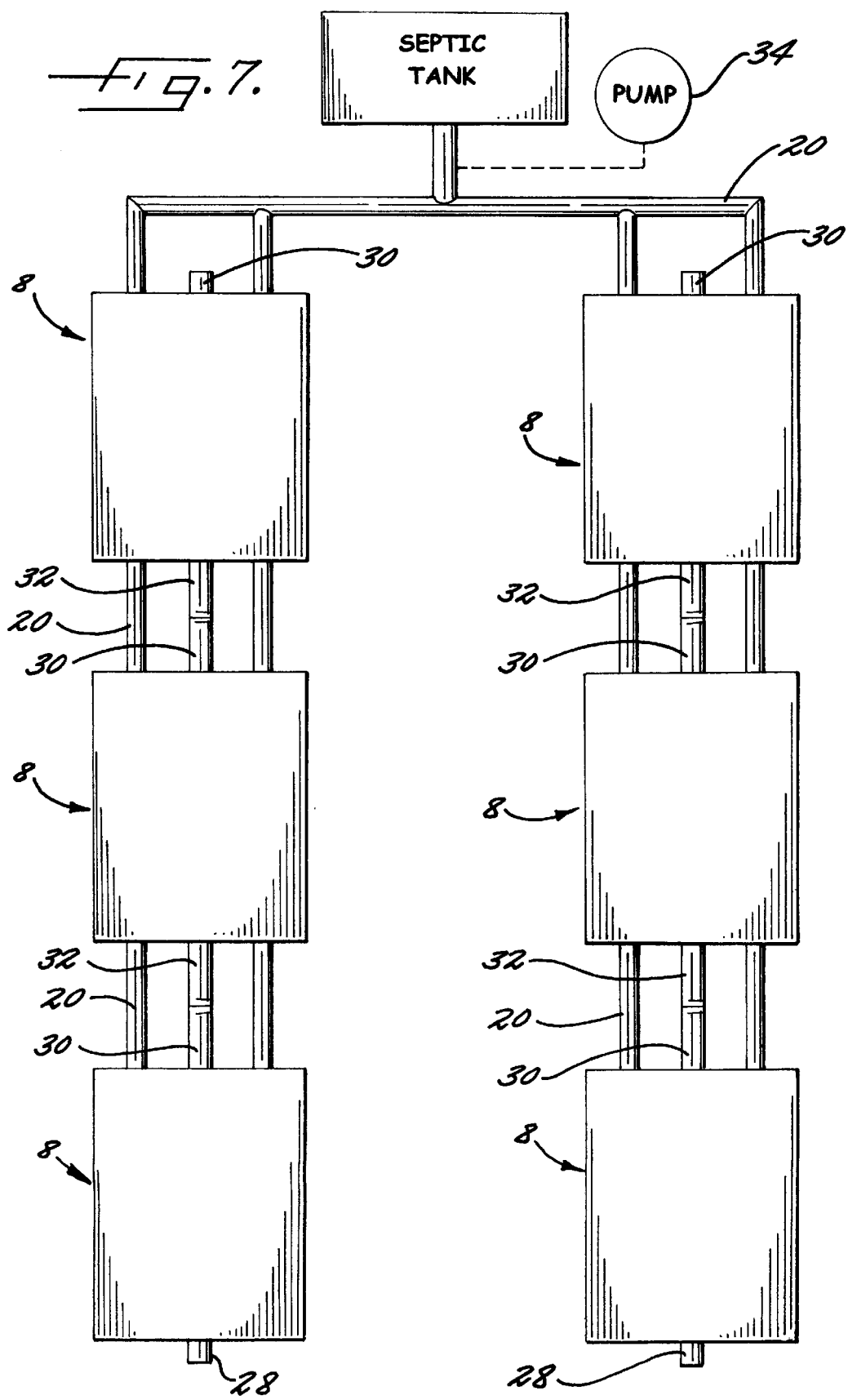
FIG. 7 is a schematic diagram showing a plurality of chains of filter containers connected to a septic tank.

The invention, as seen in FIGS. 6 and 7, also includes a complete system 40 for filtering sewage effluent from a septic tank. The system 40 functions essentially as a replacement for a conventional septic tank drain field. The system 40 includes a plurality of the filter containers 8 described above, connected to a septic tank. The containers are connected in fluid communication with the septic tank such that each filter container 8 of the plurality is connected with at least one other filter container 8 to form a chain of filter containers, as shown in FIG. 6. A plurality of chains of filter containers may also be installed to provide additional filtering capacity to the system 40, as shown in FIG. 7. The system 40 of interconnected filter containers is generally buried in a trench so as to form a field resembling a conventional drain field for a septic tank. However, the present system 40 requires a smaller tract of land for installation, since it provides a higher level of filtration per unit of land than a conventional drain field. Once placed within trenches and connected to the septic tank, the system 40 of filter containers is covered with soil. Advantageously, because the filters in the filter containers 8 are easily changeable, the system 40 may be opened and renewed when necessary. The drainage field of the present invention is, essentially, indefinitely renewable.

FIGS. 1 through 7 additionally illustrate a method of filtering sewage effluent from a septic tank. The method includes the step of connecting in fluid communication with the septic tank a plurality of filter containers such that each filter container 8 of the plurality is in fluid communication with at least one other filter container 8 to form a chain of filter containers, as best shown in FIGS. 6 and 7. Filter containers may be connected so as to form a single chain of containers, as shown in FIG. 6, or to form a plurality of chains of containers, as illustrated in FIG. 7. The number of chains of filter containers in a drainage field may be few or many, and may be determined according to the requirements of the job as known to those skilled in the art. The filter containers 8 connected essentially in series are substantially as described hereinabove.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A filter container for filtering sewage effluent from a septic tank, said filter container comprising:
   a) a body having a lower end and an upper end, having walls forming a floor positioned at the lower end and sides connected to the floor and positioned to define an inner cavity extending from the lower end to the upper end, the body having a mouth opening positioned at the upper end to provide access to said inner cavity;
   b) a lid positioned on the upper end of the body so as to cover the mouth to thereby substantially close access to the inner cavity;
   c) a plurality of pipes connecting the container in fluid communication with the septic tank or with another filter container, wherein said plurality of pipes includes at least one sewage delivery pipe for delivering sewage effluent from said septic tank to the inner cavity, at least one inlet pipe for delivering filtered sewage effluent from another filter container to the inner cavity, and at least one outlet pipe for discharging filtered sewage effluent from the inner cavity to another filter container; and
   d) at least one filter comprising a lightweight particulate material, the filter positioned within the inner cavity of the filter container for filtering the sewage effluent.

2. The filter container of claim 1, further including a plurality of sewage delivery pipes positioned at the upper end of the container, said pipes being perforated pipes to thereby deliver sewage effluent into the inner cavity so that the sewage effluent flows therefrom through the filter.

3. The filter container of claim 2, wherein said plurality of sewage delivery pipes comprises preassembled drainage lines having a perforated pipe positioned within a water permeable sleeve member substantially containing the light weight particulate material therein so that the inlet pipes are substantially surrounded by the light weight particulate material to thereby provide filtration for the sewage effluent.

4. The filter container of claim 1, further comprising a clean out port positioned at the lower end connecting the inner cavity to the outside to thereby provide access for cleaning out the inner cavity.

5. The filter container of claim 1, wherein said inlet pipe comprises an inlet T-pipe and said outlet pipe comprises an outlet T-pipe, each said T-pipe having a first pipe and a second pipe connected medially to said first pipe and extending substantially perpendicularly therefrom, said inlet T-pipe and outlet T-pipe positioned substantially opposite each other at the lower end of the container body so that the second pipe of said inlet T-pipe forms an inlet to the inner cavity and the second pipe of said outlet T-pipe forms an outlet to the inner cavity, the first pipe of each said T-pipe being positioned substantially vertically within the inner cavity.

6. The filter container of claim 1, wherein at least one sewage delivery pipe is positioned at the upper end of the container body and has perforations positioned to form a sewage effluent spray directed upwardly toward the lid of the container so as to drip therefrom onto said at least one filter for filtering the sewage effluent.

7. The filter container of claim 6, wherein said lid has a lower surface forming a ceiling for the inner chamber, said lower surface having a plurality of drip nipples for collecting the sewage effluent spray and dripping the sewage effluent therefrom onto said at least one filter.

8. The filter container of claim 7, wherein said lower surface is inclined to thereby aid in dripping sewage effluent from the drip nipples.

9. The filter container of claim 1, wherein said filter comprises relatively larger particulate material positioned toward the upper end of the container and relatively smaller particulate material positioned toward the lower end of the container to thereby provide a filter having progressively smaller pore size from the upper end to the lower end of the filter container body.

10. The filter container of claim 1, wherein said filter is positioned within a water permeable sleeve member, making said filter easily removable from the filter container.

11. The filter container of claim 1, wherein the lightweight particulate material is selected from expanded polystyrene particles, and rubber chips.

12. The filter container of claim 1, further including a plurality of filtered effluent discharge openings providing fluid communication from the inner cavity to the outside to thereby discharge filtered effluent from the filter container.

13. A system for filtering sewage effluent from a septic tank, the system comprising a plurality of filter containers connected in fluid communication with the septic tank such that each filter container of the plurality is in fluid connection with at least one other filter container to from a chain of filter containers, wherein each individual filter container of the plurality comprises:

a) a body having a lower end and an upper end, having walls forming a floor positioned at the lower end and sides connected to the floor and positioned to define an inner cavity extending from the lower end to the upper end, the body having a mouth opening positioned at the upper end to provide access to said inner cavity;

b) a lid positioned on the upper end of the body so as to cover the mouth to thereby sudstantially close access to the inner cavity;

c) a plurality of pipes connecting the container, in fluid communication with the septic tank and with another filter container, wherein said plurality of pipes includes at least one sewage delivery pipe for delivering sewage effluent from said septic tank to the inner cavity, at least one inlet pipe for delivering filtered sewage effluent from another filter container to the inner cavity, and at least one outlet pipe discharging filtered sewage effluent from the inner cavity to another filter container; and d) at least one filter comprising a lightweight particulate material, the filter positioned within the inner cavity of the filter container for filtering the sewage effluent.

14. The system of claim 13, wherein each filter container in the chain of filter containers further includes a plurality of sewage delivery pipes in fluid connection with the septic tank, said sewage delivery pipes positioned pipes to thereby delivery sewage effluent into the inner cavity so that the sewage effluent flows therefrom through the filter.

15. The system of claim 14, wherein said plurality of sewage delivery pipes comprises preassembled drainage lines having a perforated pipe positioned within a water permeable sleeve member substantially containing the light weight particulate material therein so that the inlet pipes are substantially surrounded by the light weight particulate material to thereby provide filtration for the sewage effluent.

16. The system of claim 13, wherein each filter container further includes a clean out port positioned at the lower end connecting the inner cavity to the outside to thereby provide access for cleaning out the inner cavity.

17. The system of claim 13, wherein said plurality of pipes includes an inlet T-pipe and an outlet T-pipe, each said T-pipe having a first pipe and a second pipe connected medially to said first pipe and extending substantially perpendicularly therefrom, said inlet T-pipe and outlet T-pipe positioned substantially opposite each other at the lower end of the container body so that the second pipe of said inlet T-pipe forms an inlet to the inner cavity and the second pipe of said outlet T-pipe forms an outlet to the inner cavity.

18. The system of claim 17, wherein the outlet T-pipe of one filter container is connected to the inlet T-pipe of another container to thereby form the chain of filter containers.

19. The system of claim 13, wherein the at least one sewage delivery pipe has perforations positioned to form a sewage effluent spray directed upwardly toward the lid of the container so as to drip therefrom onto said at least one filter for filtering the sewage effluent.

20. The system of claim 19, wherein said lid has a lower surface forming a ceiling for the inner chamber, said lower surface having a plurality of drip nipples for collecting the sewage effluent spray and dripping the sewage effluent therefrom onto said at least one filter.

21. The system of claim 20, wherein said lower surface is inclined to thereby aid in dripping sewage effluent from the drip nipples.

22. The system of claim 13, wherein each filter container further includes a filter comprising relatively larger particulate material positioned toward the upper end of the container and relatively smaller particulate material positioned toward the lower end of the container to thereby provide a filter having progressively smaller pore size from the upper end to the lower end of the filter container body.

23. The system of claim 13, wherein said filter is positioned within a water permeable sleeve member, making said filter easily removable from the filter container.

24. The system of claim 13, further including a pump to pump the sewage effluent from the septic tank through the chain of filter containers.

25. The system of claim 13, wherein at least one filter container further includes a plurality of filtered effluent discharge openings providing fluid communication from the inner cavity to the outside to thereby discharge filtered effluent from the filter container to a soil drainage field.

* * * * *

UNITED STATES PATENT AND TRADEMARK OFFICE
CERTIFICATE OF CORRECTION

PATENT NO.    : 6,267,882 B1
DATED         : July 31, 2001
INVENTOR(S)   : Houck It is certified that error appears in the above-identified patent and that said Letters Patent is hereby corrected as shown below:

<u>Column 7,</u>
Line 22, change word "from" to -- form.--
Line 49, after the word "positioned" add -- at the upper end of the container, said pipes being perforated --
Line 51, change word "delivery" to -- deliver --

Signed and Sealed this

Twentieth Day of August, 2002

Attest:

JAMES E. ROGAN
*Attesting Officer*   *Director of the United States Patent and Trademark Office*